Patented Oct. 9, 1934

1,975,890

UNITED STATES PATENT OFFICE

1,975,890

SALTS OF PYROCATECHOL BORATE AND METHODS FOR PREPARING THE SAME

Ira Williams, Woodstown, N. J., and Arthur M. Neal, Wilmington, Del., assignors to E. I. du Pont de Nemours & Company, Wilmington, Del., a corporation of Delaware No Drawing. Application June 17, 1932,
Serial No. 617,866

22 Claims. (Cl. 260—43)

This invention relates to new compositions of matter and methods of making them, and more particularly to a new method of making salts of the complex acid formed from pyrocatechol and boric acid, and to certain new salts produced thereby.

J. Böesken and co-workers have already described certain salts of the complex acid formed from pyrocatechol and boric acid. These compounds were prepared by heating an aqueous solution of 2 mols of pyrocatechol, 1 mol of boric acid and 1 mol of a base. After a short period of heating the salt begins to be formed and on allowing the solution to cool a further quantity of the salt crystallizes from the solution. The preparation and properties of the potassium, ammonium, and aniline salts of dicatechol borate are described by J. Böesken, in Rec. Trav. Chim. 37 184 (1918); the preparation and properties of the sodium and pyridine salts are given by J. Meulenhoff, in Rec. Trav. Chim. 44 150 (1925).

Most of the salts of dicatechol borate are somewhat soluble in water and some are extremely water-soluble. This renders it extremely difficult to recover quantitative yields of these compounds. Furthermore, certain of the organic bases are only slightly soluble in water thus making it extremely difficult to prepare the corresponding salts by the methods employed by Böesken and co-workers.

An object of the present invention is to provide a new method for the preparation of salts of dicatechol borate. A further object is to provide such a new method whereby quantitative yields may be obtained at less cost. A still further object is to provide new and valuable salts of dicatechol borate. Other and further objects are to provide new compositions of matter and to advance the art. Other objects will appear hereinafter.

These objects may be accomplished according to our invention which comprises fusing together pyrocatechol, boric acid and a base, by heating a mixture comprising two mols of pyrocatechol, one mol of boric acid and a base to temperatures appreciably above the melting point of the mixture, whereupon water is eliminated and a salt of dicatechol borate is formed.

In order to more fully illustrate our invention and the preferred mode in which we contemplate carrying the same into effect, the following examples are given:

Example 1.—239 pounds of di-ortho-tolyl-guanidine, 220 pounds of pyrocatechol and 70 pounds of boric acid were mixed and heated in an iron kettle. The mass became liquid at a temperature of 90° C. and, as the temperature was raised, water began to distill out of the reaction mass. As the water was eliminated, the freezing point of the mixture rose quite rapidly and it became necessary to heat rapidly in order to keep the mass molten. When the temperature of the reaction mass had risen to 170° C., no more water was evolved and the reaction was complete. The molten mass was drawn off into pans and allowed to cool. The product formed is the di-ortho-tolyl-guanidine salt of dicatechol borate. It is a white crystalline solid, melting at 167° C.

Example 2.—211 pounds of diphenyl-guanidine, 220 pounds of pyrocatechol and 70 pounds of boric acid were mixed and heated in an iron kettle with agitation. When the reaction mass reached a temperature of 100° C., water was split out. As the reaction proceeded, it was necessary to increase the heat in order to maintain the reaction mass in a molten condition. When the temperature reached 235° C., no more water was evolved and the reaction was complete. The molten mass was then drawn off into pans and allowed to cool. The product, which is the diphenyl-guanidine salt of dicatechol borate, is a white crystalline solid, melting at 230° C.

Example 3.—129 pounds of dibutylamine, 220 pounds of pyrocatechol and 70 pounds of boric acid were mixed and heated in a kettle equipped with a stirrer and a reflux column. The mass was heated gradually and the reflux condenser so adjusted that the water split out in the reaction distilled out while any unreacted dibutylamine was confined to the reaction kettle. As the reaction proceeded and water was eliminated, the freezing point of the reaction mass rose quite rapidly. When the temperature of the mass reached 168° C., no more water was split out and the reaction was complete. The product, which is the dibutylamine salt of dicatechol borate, is a white crystalline substance melting at 163° C.

The following new compounds may also be prepared by this method:

| Compound | Physical state | M.P. |
|---|---|---|
| b-naphthylamine salt of dicatechol borate. | White crystalline | 206° C. |
| Piperidine salt of dicatechol borate. | White crystalline solid | 255° C. |
| 1-methyl-2,4-diamino-benzene salt of dicatechol borate. | do | 227° C. |
| Mono-butylamine salt of dicatechol borate. | do | 232° C. |
| Tributylamine salt of dicatechol borate. | do | 134° C. |
| a-methyl piperidine salt of dicatechol borate. | do | 238° C. |

The above described process may also be employed for the preparation of compounds previously described by Böesken and Meulenhoff with the obtention of much higher yields and with more ready recovery of the product. By the use of our process employing pure reagents, quantitative yields of the pure salt are obtained without the necessity for employing tedious and expensive purification processes. The compounds do not need to be recovered from aqueous solutions. Further, the solubility in water of the organic bases employed becomes of no moment and salts of insoluble organic bases may be prepared as readily as the salts of the soluble bases. Accordingly, all the disadvantageous features of the method of Böesken et al. are eliminated by our process.

While the process is carried out preferably by the method described above, namely,—forming an intimate mixture of all the ingredients before heating, the process may be modified in various ways, for example, the organic base may be heated to a temperature in excess of its melting point or in the case of liquids and low melting solids, to a temperature in excess of 110° C. and an intimate mixture of pyrocatechol and boric acid added slowly with stirring. When carried out in this alternative manner, the molten mixture has a tendency to foam violently, requiring more care to be taken in carrying out the process in order to prevent the foaming. Furthermore, since the salts of dicatechol borate are extremely sensitive to oxidation in the presence of an alkaline medium, the salts formed by this alternative method are often somewhat contaminated and, as a result, are darker in color.

Since the sodium, potassium, ammonium, aniline and pyridine salts of dicatechol borate prepared according to our method are identical with those obtained from the aqueous solutions employing the method of Böesken, we assign the same formulæ to our compounds that he has already given to such compounds as the potassium and aniline salts of dicatechol borate. While the exact configuration of these compounds can not be definitely known, Meulenhoff, Rec. Trav. Chim. 44 150 (1925) on the basis of the increase of the conductance of solutions of boric acid upon the addition of pyrocatechol as well as from analytical data, has proposed, as the formula of the complex acid formed between pyrocatechol and boric acid, the following:

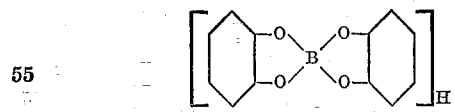

Accepting the above formula as being correct for that of the free acid without, however, limiting ourselves to any theory as to the correct structural formula of our compounds, the following formulæ are assigned to our new compounds:

di-ortho-tolyl-guanidine salt of dicatechol borate

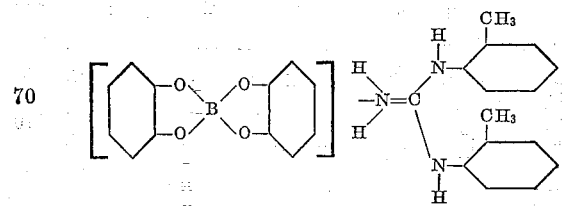

diphenyl guanidine salt

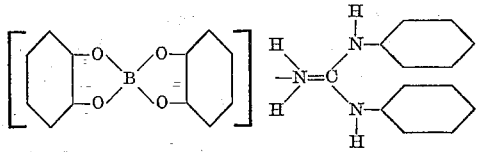

dibutylamine salt

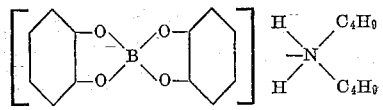

mono-butylamine salt

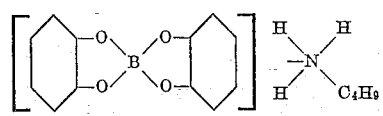

tributylamine salt

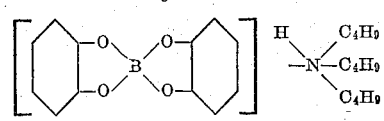

b-naphthylamine salt

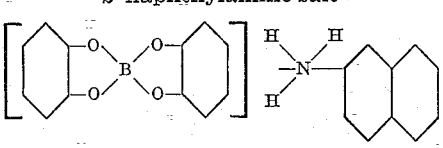

piperidine salt

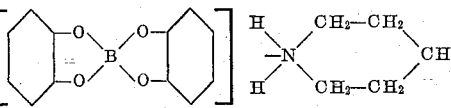

1-methyl-2,4-diamino-benzene salt

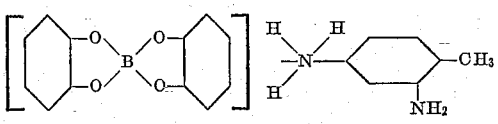

a-methyl-piperidine salt

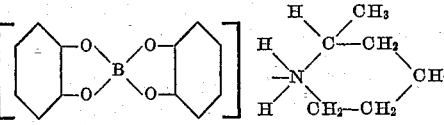

ethanolamine salt

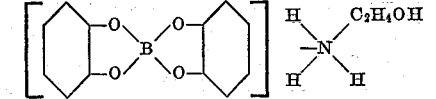

While we have disclosed certain new compounds and methods for preparing the same it is to be understood that various changes and modifications may be made therein without departing from the spirit of our invention. Accordingly, the scope of our invention is to be limited solely by the appended claims construed as broadly as is permissible in view of the prior art.

We claim:

1. The method which comprises fusing together pyrocatechol, boric acid and an organic base.

2. The method which comprises fusing together pyrocatechol, boric acid and an organic base in the proportions of two mols of pyrocatechol and one mol of the base to each mol of the boric acid.

3. The method which comprises mixing pyrocatechol, boric acid and an organic base, melting the mixture and maintaining the mixture in molten condition until reaction between the constituents of the mix is complete.

4. The method which comprises mixing pyrocatechol, boric acid and an organic base, in the proportions of two mols of pyrocatechol and one mol of the base to each mol of the boric acid, melting the mixture and maintaining the mixture in molten condition until reaction between the constituents of the mix is complete.

5. The method which comprises fusing together pyrocatechol, boric acid and a diarylguanidine.

6. The method which comprises fusing together pyrocatechol, boric acid and a diarylguanidine, in the proportions of two mols of pyrocatechol, one mol of the diarylguanidine and one mol of boric acid.

7. The method which comprises fusing together pyrocatechol, boric acid and di-ortho-tolyl-guanidine.

8. The method which comprises fusing together pyrocatechol, boric acid and di-ortho-tolyl-guanidine, in the proportions of two mols of pyrocatechol, one mol of di-ortho-tolyl-guanidine and one mol of boric acid.

9. The method which comprises fusing together pyrocatechol, boric acid and an organic amine.

10. The method which comprises fusing together pyrocatechol, boric acid and an organic amine in the proportions of two mols of pyrocatechol and one mol of the amine to each mol of the boric acid.

11. The method which comprises mixing pyrocatechol, boric acid and an organic amine, melting the mixture and maintaining the mixture in molten condition until reaction between the constituents of the mix is complete.

12. The method which comprises mixing pyrocatechol, boric acid and an organic amine, in the proportions of two mols of pyrocatechol and one mol of the amine to each mol of the boric acid, melting the mixture and maintaining the mixture in molten condition until reaction between the constituents of the mix is complete.

13. A diarylguanidine salt of a pyrocatechol borate.

14. A mono diarylguanidine salt of dipyrocatechol borate.

15. A di-ortho-tolyl-guanidine salt of a pyrocatechol borate.

16. The mono di-ortho-tolyl guanidine salt of dipyrocatechol borate.

17. The method which comprises fusing together pyrocatechol, boric acid and a butylamine.

18. The method which comprises fusing together pyrocatechol, boric acid and dibutylamine.

19. The method which comprises fusing together pyrocatechol, boric acid and a butylamine in the proportions of two mols of pyrocatechol and one mol of the butylamine to each mol of the boric acid.

20. The method which comprises fusing together pyrocatechol, boric acid and dibutylamine in the proportions of two mols of pyrocatechol and one mol of dibutylamine to each mol of the boric acid.

21. The method which comprises fusing together pyrocatechol, boric acid and piperidine.

22. The method which comprises fusing together pyrocatechol, boric acid and piperidine in the proportions of two mols of pyrocatechol and one mol of piperidine to each mol of the boric acid.

IRA WILLIAMS.
ARTHUR M. NEAL.